United States Patent
Takanashi

(10) Patent No.: US 12,180,397 B2
(45) Date of Patent: Dec. 31, 2024

(54) POLYORGANOSILOXANE COMPOSITION FOR USE IN ADHESION OF A POLYPHENYLENE SULFIDE RESIN

(71) Applicant: MOMENTIVE PERFORMANCE MATERIALS JAPAN LLC, Tokyo (JP)

(72) Inventor: Masanori Takanashi, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 204 days.

(21) Appl. No.: 17/773,041

(22) PCT Filed: Oct. 20, 2020

(86) PCT No.: PCT/JP2020/039351
§ 371 (c)(1),
(2) Date: Apr. 29, 2022

(87) PCT Pub. No.: WO2021/085230
PCT Pub. Date: May 6, 2021

(65) Prior Publication Data
US 2022/0403211 A1      Dec. 22, 2022

(30) Foreign Application Priority Data

Oct. 29, 2019   (JP) ................................. 2019-196407

(51) Int. Cl.
*C09J 7/25*    (2018.01)
*C09J 7/30*    (2018.01)
*C09J 11/04*   (2006.01)

(52) U.S. Cl.
CPC ............. *C09J 7/25* (2018.01); *C09J 7/30* (2018.01); *C09J 11/04* (2013.01); *C09J 2481/006* (2013.01); *C09J 2483/00* (2013.01)

(58) Field of Classification Search
CPC ....... C09J 7/25; C09J 7/30; C09J 11/04; C09J 2481/006; C09J 2483/00
See application file for complete search history.

(56) References Cited

U.S. PATENT DOCUMENTS

| | | |
|---|---|---|
| 5,883,184 A | 3/1999 | Nagaoka |
| 9,303,164 B2 | 4/2016 | Takanashi |
| 2007/0112149 A1 | 5/2007 | Hara |
| 2010/0208189 A1 | 8/2010 | Takanashi |
| 2013/0065999 A1 | 3/2013 | Takanashi |
| 2015/0337188 A1 | 11/2015 | Sakakibara et al. |
| 2015/0337189 A1 | 11/2015 | Takanashi et al. |
| 2015/0361320 A1 | 12/2015 | Tang et al. |
| 2021/0147738 A1 | 5/2021 | Takanashi et al. |
| 2021/0395582 A1 | 12/2021 | Takanashi |
| 2022/0056326 A1 | 2/2022 | Otashiro et al. |

FOREIGN PATENT DOCUMENTS

| | | | |
|---|---|---|---|
| JP | H07126533 A | 5/1995 | |
| JP | 2006117845 A | 5/2006 | |
| JP | 2013124297 A | 6/2013 | |
| JP | 2015003987 A | 1/2015 | |
| JP | 2016510358 A | 4/2016 | |
| JP | 2018012809 A | 1/2018 | |
| JP | 2019151695 A | 9/2019 | |
| WO | WO-2011152101 A1 * | 12/2011 | ........... B60C 1/0008 |
| WO | 2014104080 A1 | 7/2014 | |

OTHER PUBLICATIONS

English machine translation of JP2015003987.*
English machine translation of JP2013124297.*
International Search Report (ISR) (and English translation thereof) dated Dec. 28, 2020, issued in International Application No. PCT/JP2020/039351.
Written Opinion dated Dec. 28, 2020, issued in International Application No. PCT/JP2020/039351.
Chinese Office Action (and partial English translation thereof) dated Aug. 24, 2023, issued in counterpart Chinese Application No. 202080074395.3.

* cited by examiner

*Primary Examiner* — Robert S Walters, Jr.
(74) *Attorney, Agent, or Firm* — Holtz, Holtz & Volek PC

(57) ABSTRACT

An addition reaction curing type polyorganosiloxane composition for bonding poly(phenylene sulfide) resins includes (A) a polyorganosiloxane containing two or more alkenyl groups in the molecule, (B) a polyorganohydrogensiloxane having, in the molecule, three or more silicon-atom-bonded hydrogen atoms, (C) a platinum-based catalyst, (D) an oxide or carbonate of a metal selected from among the metals in Groups 2 and 12 of the periodic table, and (E) an adhesion promoter, the content of the ingredient (D) being 0.1-20 wt % with respect to the whole composition.

8 Claims, No Drawings

POLYORGANOSILOXANE COMPOSITION FOR USE IN ADHESION OF A POLYPHENYLENE SULFIDE RESIN

TECHNICAL FIELD

The present invention relates to a polyorganosiloxane composition which is cured by an addition reaction, and which is for use in adhesion of a polyphenylene sulfide resin.

BACKGROUND ART

An addition reaction curing type polyorganosiloxane composition is cured at room temperature or by heating to a low temperature (40 to 150° C.) to exhibit adhesion to various adherends. Patent Literature 1 has proposed a polyorganosiloxane composition having adhesion properties, which comprises a zirconium compound and a specific adhesion imparting agent (Patent Literature 1).

Meanwhile, in the aircraft and automobile industries and in the field of electronic materials, there are increasing demands that measures must be taken to solve global environment problems and the products should be reduced in size and weight, and studies are being made on the use of plastic materials as a substitute for metals, such as iron and aluminum. Particularly, a polyphenylene sulfide resin is an engineering plastic which is excellent in properties, such as a heat resistance, flame retardancy, a chemical resistance, electrical insulating properties, a resistance to moist heat, a mechanical strength, and dimensional stability, and has attracted attention as a substitute material for metals.

CITATION LIST

Patent Literature

Patent Literature 1: JP 2019-151695 A

SUMMARY OF INVENTION

Technical Problem

A cured product of the composition described in Patent Literature 1 has excellent adhesion to metals, such as iron and aluminum. With respect to the adhesion to a polyphenylene sulfide resin, the cured product exhibits excellent adhesion, immediately after curing, in an environment at a relatively low temperature, and in a high temperature environment when used for a short time, but a problem arises in that the adhesion is considerably reduced when used in a high temperature environment for a long term.

A subject of the present invention is to provide an addition reaction curing type polyorganosiloxane composition which has not only excellent adhesion to a polyphenylene sulfide resin but also a small lowering of the adhesion even when used in a high temperature environment for a long term.

Solution to Problem

The present inventors have conducted extensive and intensive studies with a view toward solving the above-mentioned problems. As a result, it has been found that, when an adhesion body of a polyphenylene sulfide resin and a cured product of a polyorganosiloxane composition is used in a high temperature environment for a long term, for example, used in an environment at 150° C. or higher, a compound containing sulfur derived from the polyphenylene sulfide resin migrates into the adhesive interface, and the cured product is reduced in weight. Thus, the present inventors considered that the compound containing sulfur, which has migrated into the adhesive interface, decomposes the resin in the cured product, and the resultant decomposition product volatilizes, leading to reduction of the weight of the cured product and lowering of the adhesion to the polyphenylene sulfide resin. The present inventors have made studies on suppression of an adverse effect of the compound containing sulfur. As a result, they have found that, by incorporating an oxide or carbonate of a metal selected from metals belonging to Groups 2 and 12 of the Periodic Table into a polyorganosiloxane composition, the resultant composition is suppressed in a lowering of the adhesion when used in a high temperature environment, and thus the present invention has been completed.

The present invention is directed to the following items [1] to [10].

[1] A polyorganosiloxane composition for use in adhesion of a polyphenylene sulfide resin, the composition comprising:
(A) a polyorganosiloxane containing two or more alkenyl groups per molecule;
(B) a polyorganohydrogensiloxane having three or more hydrogen atoms bonded to silicon atoms per molecule;
(C) a platinum catalyst;
(D) an oxide or carbonate of a metal selected from metals belonging to Groups 2 and 12 of the Periodic Table; and
(E) an adhesion imparting agent,
wherein the content of the component (D) in the whole composition is 0.1 to 20% by weight.

[2] The polyorganosiloxane composition according to item [1] above, wherein the component (D) is an oxide or carbonate of a metal selected from magnesium, calcium, and zinc.

[3] The polyorganosiloxane composition according to item [1] or [2] above, wherein the component (D) is zinc oxide.

[4] The polyorganosiloxane composition according to any one of items [1] to [3] above, wherein the component (E) comprises at least one member selected from the group consisting of the following (E1) to (E4):

(E1) an organosilicon compound having a hydrogen atom bonded to a silicon atom and having a side chain of the following formula (1) bonded to a silicon atom:

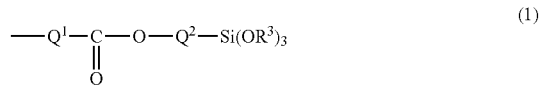

(E2) an organosilicon compound having an $Si(OR^3)_n$ group and an epoxy group-containing group, and/or a partial hydrolysis condensation product thereof, (E3) a silane compound having an $Si(OR^3)_n$ group and an aliphatic unsaturated hydrocarbon group, and/or a partial hydrolysis condensation product thereof, and (E4) a tetraalkoxysilane compound represented by $Si(OR^4)_4$, and/or a partial hydrolysis condensation product thereof, wherein, in the above formulae, $Q^1$ represents a linear or branched alkylene group which forms a carbon chain having two or more carbon atoms between the silicon atom and the ester linkage; $Q^2$ represents a linear or branched alkylene group which forms a carbon chain having three or more carbon atoms between the oxygen atom and the silicon atom of the side chain; R³ represents an alkyl group having 1 to 4 carbon atoms or a 2-methoxyethyl group; R⁴ represents an alkyl group having 1 to 3 carbon atoms; and n is an integer of 1 to 3.

[5] The polyorganosiloxane composition according to any one of items [1] to [4] above, wherein the component (A) is a combination of (A1) a linear polyorganosiloxane having both ends blocked by an $R_3SiO_{1/2}$ unit and having an $R^2{}_2SiO_{2/2}$ unit as an intermediate unit, and having a viscosity of 0.1 to 500 Pa·s at 23° C., and (A2) a branched polyorganosiloxane comprising an $SiO_{4/2}$ unit and an $R_3SiO_{1/2}$ unit as essential units, and comprising as an optional unit at least one unit selected from the group consisting of an $R_2SiO_{2/2}$ unit and/or an $RSiO_{3/2}$ unit, wherein, in the above formulae, R is $R^1$ or $R^2$, wherein $R^1$ is an alkenyl group, $R^2$ is a monovalent hydrocarbon group having no aliphatic unsaturated bond, and two or more $R^1$'s are contained per molecule.

[6] The polyorganosiloxane composition according to any one of items [1] to [5] above, wherein the component (C) is a platinum-vinylsiloxane complex.

[7] The polyorganosiloxane composition according to any one of items [1] to [6] above, further comprising (F) a zirconium compound.

[8] The polyorganosiloxane composition according to any one of items [1] to [7] above, further comprising (G) an inorganic filler having a BET specific surface area of 50 to 500 m²/g.

[9] The polyorganosiloxane composition according to any one of items [1] to [8] above, further comprising (H) a reaction inhibitor.

[10] An article comprising an adhesion portion of a polyphenylene sulfide resin and a cured product of the polyorganosiloxane composition for use in adhesion of a polyphenylene sulfide resin according to any one of items [1] to [9] above.

Advantageous Effects of Invention

In the present invention, there is provided an addition reaction curing type polyorganosiloxane composition which has not only excellent adhesion to a polyphenylene sulfide resin but also a small lowering of the adhesion even when used in a high temperature environment for a long term.

DESCRIPTION OF EMBODIMENTS

[Polyphenylene Sulfide Resin]

A polyphenylene sulfide resin (PPS resin) has a resin structure having as repeating units a structure in which an aromatic ring and a sulfur atom are bonded to each other, and specifically is a resin having a structural unit represented by the following general formula (2) as repeating units:

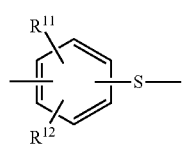
(2)

wherein each of $R^{11}$ and $R^{12}$ independently represents a hydrogen atom, an alkyl group having 1 to 4 carbon atoms, a nitro group, an amino group, a phenyl group, a methoxy group, or an ethoxy group.

In view of improving the mechanical strength of the polyphenylene sulfide resin, $R^{11}$ and $R^{12}$ in the general formula (2) above are preferably a hydrogen atom, and, in this case, as examples of the structures, there can be mentioned a structure represented by the general formula (3) below in which the sulfur atom is bonded at the para-position, and a structure represented by the general formula (4) below in which the sulfur atom is bonded at the meta-position.

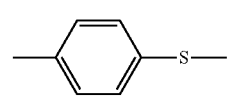
(3)

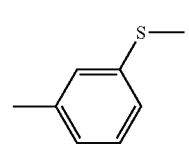
(4)

Of these, in view of improving the heat resistance or crystallinity of the polyphenylene sulfide resin, especially preferred is a structure represented by the general formula (3) above in which the sulfur atom is bonded at the para-position to the aromatic ring in the repeating units.

The polyphenylene sulfide resin may have at least one structural unit selected from structural units represented by the general formulae (5) to (8) below, in addition to the structural unit represented by the general formula (2) above. When the polyphenylene sulfide resin has at least one structural unit selected from the structural units of the general formulae (5) to (8) below, in view of achieving excellent heat resistance and mechanical strength, the molar ratio of the above structural unit to the polyphenylene sulfide resin is preferably 30 mol % or less, more preferably 10 mol % or less.

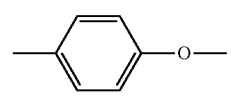
(5)

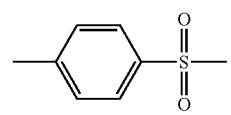
(6)

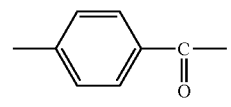
(7)

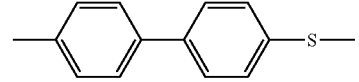
(8)

When the polyphenylene sulfide resin contains the structural units represented by the general formulae (5) to (8) above, bonding of these structural units to the structural unit represented by the general formula (2) above as repeating units may be either a random type or a block type.

Further, the polyphenylene sulfide resin may have in the structure thereof, for example, a trifunctional structural unit represented by the general formula (9) below or a naphthylsulfide bond. In this case, the molar ratio of the above structural unit to the polyphenylene sulfide resin is preferably 3 mol % or less, particularly, more preferably 1 mol % or less.

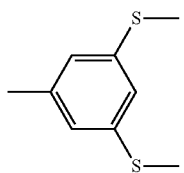
(9)

The polyphenylene sulfide resin may contain, for example, another resin, such as a polyolefin resin, a fibrous inorganic or organic filler, such as a glass fiber or a carbon fiber, an inorganic or organic pigment, a lubricant, a wax, a stabilizer, or a colorant.

The polyphenylene sulfide resin is commercially available, and examples of such polyphenylene sulfide resins include SUSTEEL (registered trademark) series, manufactured by Tosoh Corporation; FZ series, manufactured by DIC Corporation; and DURAFIDE (registered trademark) series, manufactured by Polyplastics Co., Ltd.

Definition of Terms

The structural units of the siloxane compound are frequently indicated using the abbreviations shown below (hereinafter, these structural units are frequently referred to as, for example, "M unit" and "$D^H$ unit").

M: $Si(CH_3)_3O_{1/2}$
$M^H$: $SiH(CH_3)_2O_{1/2}$
$M^{Vi}$: $(CH=CH_2)(CH_3)_2SiO_{1/2}$
D: $Si(CH_3)_2O_{2/2}$
$D^H$: $SiH(CH_3)O_{2/2}$
$D^{Vi}$: $Si(CH=CH_2)(CH_3)O_{2/2}$
T: $Si(CH_3)O_{3/2}$
Q: $SiO_{4/2}$ (tetrafunctional)

In the present specification, specific examples of groups are shown below.

Examples of monovalent hydrocarbon groups include an alkyl group, a cycloalkyl group, an aryl group, an aralkyl group, and an alkenyl group. Examples of monovalent hydrocarbon groups having no aliphatic unsaturated bond include the above-mentioned monovalent hydrocarbon groups, excluding alkenyl groups.

The alkenyl group is a linear or branched group having 2 to 6 carbon atoms, and examples of alkenyl groups include a vinyl group, an allyl group, a 3-butenyl group, and a 5-hexenyl group.

The alkyl group is a linear or branched group having 1 to 18 carbon atoms, and examples of alkyl groups include a methyl group, an ethyl group, a propyl group, a butyl group, a pentyl group, a hexyl group, an octyl group, a decyl group, a dodecyl group, a hexadecyl group, and an octadecyl group.

The cycloalkyl group is a monocyclic or polycyclic group having 3 to 20 carbon atoms, and examples of cycloalkyl groups include a cyclopentyl group and a cyclohexyl group.

The aryl group is an aromatic group containing a monocyclic or polycyclic group having 6 to 20 carbon atoms, and examples of aryl groups include a phenyl group and a naphthyl group.

The aralkyl group is an alkyl group substituted with an aryl group, and examples of aralkyl groups include a 2-phenylethyl group and a 2-phenylpropyl group.

The alkylene group is a linear or branched group having 1 to 18 carbon atoms, and examples of alkylene groups include a methylene group, an ethylene group, a trimethylene group, a 2-methylethylene group, and a tetramethylene group.

The alkenyl group, alkyl group, cycloalkyl group, aryl group, aralkyl group, and alkylene group may be substituted with, for example, a halogen, such as chlorine, fluorine, or bromine, or a cyano group. Examples of the groups substituted with a halogen or a cyano group include a chloromethyl group, a chlorophenyl group, a 2-cyanoethyl group, and a 3,3,3-trifluoropropyl group.

In the present specification, "(A) a polyorganosiloxane containing two or more alkenyl groups per molecule" is frequently referred to as "(A)". The same applies to "(C) a platinum catalyst" and other components.

[Polyorganosiloxane Composition for Use in Adhesion of a Polyphenylene Sulfide Resin]

The polyorganosiloxane composition for use in adhesion of a polyphenylene sulfide resin (hereinafter, frequently referred to simply as "the composition") comprises (A) a polyorganosiloxane containing two or more alkenyl groups per molecule; (B) a polyorganohydrogensiloxane having three or more hydrogen atoms bonded to silicon atoms per molecule; (C) a platinum catalyst; (D) an oxide or carbonate of a metal selected from metals belonging to Groups 2 and 12 of the Periodic Table; and (E) an adhesion imparting agent, wherein the content of the component (D) in the whole composition is 0.1 to 20% by weight.

The composition can achieve excellent adhesion to a polyphenylene sulfide resin at room temperature (for example, 23° C.) in a curing time of at least one week, preferably 72 hours, especially preferably 24 hours. Further, the composition can achieve excellent adhesion to a polyphenylene sulfide resin at 50° C. in a curing time of 30 minutes. Further, the composition can achieve excellent adhesion in a short time by heating to, for example, 100 to 150° C.

The adhesion body of a polyphenylene sulfide resin and a cured product of the composition adhered as described above has a small lowering of the adhesion even when used in a high temperature environment for a long term. In the present invention, the high temperature environment means an environment at 100° C. or higher, specifically an environment at 120° C. or higher, particularly 150° C. or higher. Further, the long term means a time period of one day or longer, specifically one week or longer, particularly one month or longer. It is considered that component (D) captures a compound containing sulfur derived from the polyphenylene sulfide resin, which compound has migrated into the adhesive interface in a high temperature environment, so that decomposition of the resin in the cured product is suppressed, maintaining the adhesion. Therefore, the composition of the present invention can be advantageously used as an adhesive for a polyphenylene sulfide resin.

The present invention is also directed to a use of and a method for using (D) an oxide or carbonate of a metal selected from metals belonging to Groups 2 and 12 of the Periodic Table in producing an adhesive for a polyphenylene sulfide resin. The present invention is further directed to a method for adhesion of a polyphenylene sulfide resin and a cured product of the polyorganosiloxane composition, the method comprising the steps of: preparing the polyorganosiloxane composition of the present invention; applying the composition to a polyphenylene sulfide resin; and curing the composition.

<(A) Polyorganosiloxane Containing Two or More Alkenyl Groups Per Molecule>

(A) a polyorganosiloxane containing two or more alkenyl groups per molecule (hereinafter, frequently referred to as "alkenyl group-containing polyorganosiloxane (A)") is a component which serves as a base polymer of the composition. With respect to component (A), there is no particular limitation as long as it has two or more alkenyl groups bonded to silicon atoms per molecule on average and is capable of forming a network structure by an addition reaction with a hydrosilyl group (Si—H group) of component (B). Component (A) representatively has in the molecule thereof at least two alkenyl group-containing siloxane units represented by the following general formula (I):

$(R^1)_a(R^2)_b SiO_{(4-a-b)/2}$ (I)

wherein:
$R^1$ is an alkenyl group;
$R^2$ is a monovalent hydrocarbon group having no aliphatic unsaturated bond;
a is an integer of 1 to 3; and
b is an integer of 0 to 2, with the proviso that a+b is 1 to 3.

The number of the alkenyl groups bonded to silicon atoms in component (A) per molecule is preferably 2 to 100, more preferably 2 to 50. Component (A) is not component (E3).

In view of ease of synthesis and no adverse effect on the fluidity of the composition before cured and the heat resistance of the composition after cured, $R^1$ is preferably a vinyl group. In view of ease of synthesis, a is preferably 1. In view of ease of synthesis and excellent balance of properties, such as a mechanical strength and fluidity before cured, $R^2$ is preferably a methyl group.

Examples of organic groups bonded to silicon atoms of other siloxane units in component (A) include a monovalent hydrocarbon group having no aliphatic unsaturated bond. The organic group is preferably a methyl group for the same reason as that for $R^2$.

$R^1$ may be present either at an end of the molecular chain of component (A) or in the middle of the molecular chain of component (A), or may be present in both of them.

The siloxane skeleton of component (A) can be linear or branched. That is, component (A) can be (A1) a linear alkenyl group-containing polyorganosiloxane or (A2) a branched alkenyl group-containing polyorganosiloxane.

As an example of (A1) a linear alkenyl group-containing polyorganosiloxane, there can be mentioned a linear polyorganosiloxane having both ends blocked by an $R_3SiO_{1/2}$ unit and having an $R^2_2SiO_{2/2}$ unit as an intermediate unit. In the above formula, R is $R^1$ or $R^2$, and two or more R's per molecule are $R^1$. (A1) preferably has a viscosity at 23° C. of 0.1 to 500 Pa·s, more preferably 0.5 to 300 Pa·s, especially preferably 1.0 to 200 Pa·s. In (A1), the $R_3SiO_{1/2}$ unit is preferably an $R^1R^2_2SiO_{1/2}$ unit, an $R^1_2R^2SiO_{1/2}$ unit, or an $R^1_3SiO_{1/2}$ unit, especially preferably an $R^1R^2_2SiO_{1/2}$ unit. Particularly, (A1) is especially preferably a linear polyorganosiloxane having both ends blocked by an $M^{vi}$ unit (dimethylvinylsiloxane unit) and having an intermediate unit comprising only a D unit (dimethylsiloxane unit).

As an example of (A2) a branched alkenyl group-containing polyorganosiloxane, there can be mentioned a branched polyorganosiloxane comprising an $SiO_{4/2}$ unit and an $R_3SiO_{1/2}$ unit as essential units and comprising an $R_2SiO_{2/2}$ unit and/or an $RSiO_{3/2}$ unit as an optional unit. In the above formulae, R is $R^1$ or $R^2$, and two or more R's per molecule are $R^1$. It is preferred that at least three R's per molecule are $R^1$ and the rest is $R^2$ so as to form a cross-linking point in a curing reaction. From the viewpoint of obtaining a cured product of the composition having excellent mechanical strength, (A2) is preferably in a resin form that is a solid or a viscous semisolid at room temperature, and in which the ratio of the $R_3SiO_{1/2}$ unit and the $SiO_{4/2}$ unit is in the range of from 1:0.8 to 1:3, in terms of a molar ratio.

In (A2), $R^1$ may be present as R in the $R_3SiO_{1/2}$ unit, or may be present as R in the $R_2SiO_{2/2}$ unit or $RSiO_{3/2}$ unit. From the viewpoint of achieving quick-curing at room temperature, it is preferred that part of or all of the $R_3SiO_{1/2}$ units are an $R^1R^2_2SiO_{1/2}$ unit.

Component (A) preferably has a viscosity at 23° C. of 0.1 to 500 Pa·s, more preferably 0.5 to 300 Pa·s, especially preferably 1.0 to 200 Pa·s. When the viscosity of component (A) is in the above range, the adhesion to various substrates including a polyphenylene sulfide resin can be efficiently further improved, and the composition in an uncured state exhibits such excellent fluidity that it has excellent operating properties upon casting or potting, so that the composition after cured can exhibit excellent mechanical strength and appropriate elasticity and hardness. Further, in view of further improving the adhesion even at room temperature, component (A) preferably has a high viscosity. When component (A) is a combination of two or more members, the viscosity of component (A) means a viscosity of the mixed alkenyl group-containing polyorganosiloxanes. In the present specification, the viscosity is a value measured under conditions at 23° C. using a rotational viscometer and appropriately setting the spindle number and the number of revolutions in accordance with HS K6249:2003.

Component (A) may be a single member or a combination of two or more members. Component (A) is preferably a mixture of (A1l) a linear alkenyl group-containing polyorganosiloxane and (A2) a branched alkenyl group-containing polyorganosiloxane. Component (A) is especially preferably a combination of (A1') a linear polyorganosiloxane having both ends blocked by an $R^1R^2_2SiO_{1/2}$ unit and having an $R^2_2SiO_{2/2}$ unit as an intermediate unit, and having a viscosity of 0.1 to 500 Pa·s at 23° C., and (A2') a branched polyorganosiloxane comprising an $SiO_{4/2}$ unit, an $R^1R^2_2SiO_{1/2}$ unit, and an $R^2_3SiO_{1/2}$ unit as essential units, and comprising as an optional unit an $R_2SiO_{2/2}$ unit and/or an $RSiO_{3/2}$ unit, wherein, in the above formulae, R is $R^1$ or $R^2$, wherein $R^1$ is an alkenyl group, $R^2$ is a monovalent hydrocarbon group having no aliphatic unsaturated bond, and two or more $R^1$'s are contained per molecule.

<(B) Polyorganohydrogensiloxane Having Three or More Hydrogen Atoms Bonded to Silicon Atoms Per Molecule>

(B) a Polyorganohydrogensiloxane having three or more hydrogen atoms bonded to silicon atoms per molecule (hereinafter, frequently referred to as "polyorganohydrogensiloxane (B)") is a component such that the hydrosilyl group contained in the molecule of component (B) undergoes an addition reaction with $R^1$ of component (A) so that component (B) serves as a crosslinking agent for component (A). With respect to component (B), there is no particular limitation as long as it has three or more hydrogen atoms bonded to silicon atoms per molecule, which participate in the addition reaction, for forming a cured product having a network structure. It is preferred that component (B) does not have a reactive organic functional group, such as an epoxy group, a silanol group, or an alkoxysilyl group, except for the hydrogen atoms bonded to silicon atoms. Further, when component (B) has a cyclic siloxane structure, it is preferred that component (B) does not have an aromatic skeleton in the main chain. Component (B) is not component (E).

Component (B) representatively has in the molecule thereof three or more units represented by the following general formula (II):

wherein:
$R^5$ represents a monovalent hydrocarbon group having no aliphatic unsaturated bond;
c is an integer of 0 to 2; and
d is an integer of 1 to 3, with the proviso that c d is an integer of 1 to 3.

In view of ease of synthesis, $R^5$ is preferably a methyl group. Further, in view of ease of synthesis, d is preferably 1.

In view of ease of synthesis, it is preferred that component (B) comprises three or more siloxane units. Further, the number of the siloxane units of component (B) is preferably 6 to 200, especially preferably 10 to 150 because such component (B) does not volatilize even when heated to the curing temperature, and has such excellent fluidity that it is easily mixed with component (A).

The siloxane skeleton in component (B) may be linear, branched, or cyclic, and is preferably linear.

Component (B) is preferably (B1) a linear polyorganohydrogensiloxane having both ends each independently blocked by an $R^6{}_3SiO_{1/2}$ unit, and having an intermediate unit comprising only an $R^6{}_2SiO_{2/2}$ unit, or (B2) a polyorganohydrogensiloxane comprised only of an $R^6{}_3SiO_{1/2}$ unit and a $SiO_{4/2}$ unit (wherein, in the above formulae, each $R^6$ is independently a hydrogen atom or a monovalent hydrocarbon group having no aliphatic unsaturated bond, with the proviso that at least three or more of $R^6$'s per molecule on average are a hydrogen atom). In (B1) and (B2), examples of $R^6{}_3SiO_{1/2}$ units include a $HR^7{}_2SiO_{1/2}$ unit and an $R^7{}_3SiO_{1/2}$ unit, and examples of $R^6{}_2SiO_{2/2}$ units include a $HR^7SiO_{2/2}$ unit and an $R^7{}_2SiO_{2/2}$ unit (wherein, in the above formulae, $R^7$ is a monovalent hydrocarbon group having no aliphatic unsaturated bond). In (B1), the hydrogen atom bonded to a silicon atom may be either present at an end or present in an intermediate unit, but is preferably present in an intermediate unit.

Component (B) is especially preferably (B1-1) a linear polymethylhydrogensiloxane having both ends blocked by an M unit (trimethylsiloxane unit) and having an intermediate unit comprising only a $D^H$ unit (methylhydrogensiloxane unit), (B1-2) a linear polymethylhydrogensiloxane having both ends blocked by an M unit (trimethylsiloxane unit) and having an intermediate unit comprising only a D unit (dimethylsiloxane unit) and a $D^H$ unit (methylhydrogensiloxane unit), wherein the amount of the methylhydrogensiloxane unit is 0.1 to 2.0 mol, relative to 1 mol of the dimethylsiloxane unit, or (B2-1) a polymethylhydrogensiloxane comprised only of an $M^H$ unit (dimethylhydrogensiloxane unit) and a Q unit ($SiO_{4/2}$ unit).

Component (B) may be a single member or a combination of two or more members.

<(C) Platinum Catalyst>

(C) a platinum catalyst is a catalyst for promoting an addition reaction between the alkenyl group in component (A) and the hydrosilyl group in component (B) and for introducing the below-mentioned (E1) and/or (E3) into the siloxane network structure of the crosslinked polymer by the addition reaction.

As examples of component (C), there can be mentioned platinum compounds, such as chloroplatinic acid, a reaction product of chloroplatinic acid and an alcohol, a platinum-olefin complex, a platinum-vinylsiloxane complex, a platinum-ketone complex, and a platinum-phosphine complex. Of these, in view of excellent catalytic activity, a platinum-vinylsiloxane complex is preferred, and a platinum-1,1,3,3-tetramethyl-1,3-divinyldisiloxane complex (Pt-$M^{vi}M^{vi}$ complex) is especially preferred because the composition containing such a catalyst is cured in a short time at room temperature to exhibit adhesion.

Component (C) may be a single member or a combination of two or more members.

<(D) Oxide or Carbonate of a Metal Selected from Metals Belonging to Groups 2 and 12 of the Periodic Table>

(D) an oxide or carbonate of a metal selected from metals belonging to Groups 2 and 12 of the Periodic Table is a component such that, when an adhesion body of a polyphenylene sulfide resin and a cured product of the composition is used in a high temperature environment, the component captures a compound containing sulfur derived from the polyphenylene sulfide resin, which compound has migrated into the adhesive interface, to suppress decomposition of the resin in the cured product.

Examples of metals belonging to Group 2 of the Periodic Table include beryllium, magnesium, calcium, strontium, barium, and radium. Examples of metals belonging to Group 12 of the Periodic Table include zinc, cadmium, mercury, and copernicium. Of these, in view of achieving high capturing effect for a compound containing sulfur derived from the polyphenylene sulfide resin, component (D) is preferably an oxide or carbonate of a metal selected from magnesium, calcium, and zinc, more preferably an oxide or carbonate of zinc, especially preferably zinc oxide.

Component (D) may be a single member or a combination of two or more members.

From the viewpoint of the dispersibility of component (D) and the capturing effect for a compound containing sulfur derived from the polyphenylene sulfide resin, component (D) preferably has an average particle diameter of 0.1 to 50 µm, more preferably 0.2 to 20 µm, especially preferably 0.3 to 10 µm. The measured value of the average particle diameter is a median diameter (d50) as measured by, for example, an air-permeability method.

From the viewpoint of the capturing effect for a compound containing sulfur derived from the polyphenylene sulfide resin, component (D) preferably has a specific surface area of 0.1 to less than 50 m²/g, more preferably 0.5 to 20 m²/g, as measured by a BET method.

<(E) Adhesion Imparting Agent>

(E) an adhesion imparting agent is a component which imparts to the composition properties of adhesion to various substrates including a polyphenylene sulfide resin. Further, by virtue of component (E) contained in the composition, properties of adhesion to various substrates including a polyphenylene sulfide resin are imparted to the composition. In view of further improving the properties, component (E) preferably comprises at least one member selected from the group consisting of the following (E1) to (E4). Component (E) is generally a liquid having such excellent fluidity that the viscosity at 23° C. is 80 cP or less.

(E1) an organosilicon compound having a hydrogen atom bonded to a silicon atom and having a side chain of the following formula (1) bonded to a silicon atom:

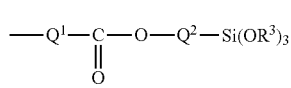
(1)

(E2) an organosilicon compound having an $Si(OR^3)_n$ group and an epoxy group-containing group, and/or a partial hydrolysis condensation product thereof, (E3) a silane compound having an $Si(OR^3)_n$ group and an aliphatic unsaturated hydrocarbon group, and/or a partial hydrolysis condensation product thereof, and (E4) a tetraalkoxysilane compound represented by $Si(OR^4)_4$, and/or a partial hydrolysis condensation product thereof, wherein, in the above formulae, $Q^1$, $Q^2$, $R^3$, $R^4$, and n are as defined above.

Each of (E1), (E2), (E3), and (E4) may be a single member or a combination of two or more members. For example, component (E) may be a combination of one member of (E1), two members of (E2), and two members of (E3).

<<(E1)>>

(E1) is a component which undergoes an addition reaction with component (A) upon curing of the composition, and which is introduced into the crosslinked siloxane structure due to the addition reaction of component (A) and component (B), so that the side chain of the formula (1) as a portion that exhibits adhesion contributes to the adhesion of the composition at room temperature. Further, the alkoxy group present in the side chain of (E1) (hereinafter, $OR^3$ represents an alkoxy group having 1 to 4 carbon atoms or a 2-methoxyethoxy group) undergoes a cohydrolysis-condensation reaction with the alkoxy group of (E2), (E3) and/or (E4) to contribute to introduction of (E2), (E3) and/or (E4) into the siloxane structure.

In view of ease of synthesis and handling, $Q^1$ is preferably an ethylene group or a 2-methylethylene group. In view of ease of synthesis and handling, $Q^2$ is preferably a trimethylene group. In view of giving excellent adhesion and in view of the alcohol caused due to hydrolysis, which is likely to volatilize, $R^3$ is preferably a methyl group or an ethyl group, especially preferably a methyl group.

In view of ease of synthesis, it is preferred that the above-mentioned hydrogen atom and the above-mentioned side chain, which are characteristic features of (E1), are bonded to separate silicon atoms. Therefore, the basic portion of (E1) preferably forms a linear, branched, or cyclic siloxane skeleton, and a cyclic siloxane skeleton is especially preferred because a specific compound can be synthesized and purified under control. The number of the Si—H bond or bonds contained in (E1) is an arbitrary number of one or more, and, in the case of a cyclic siloxane compound, the number of the Si—H bonds is preferably 2 or 3.

As examples of (E1), there can be mentioned the compounds shown below.

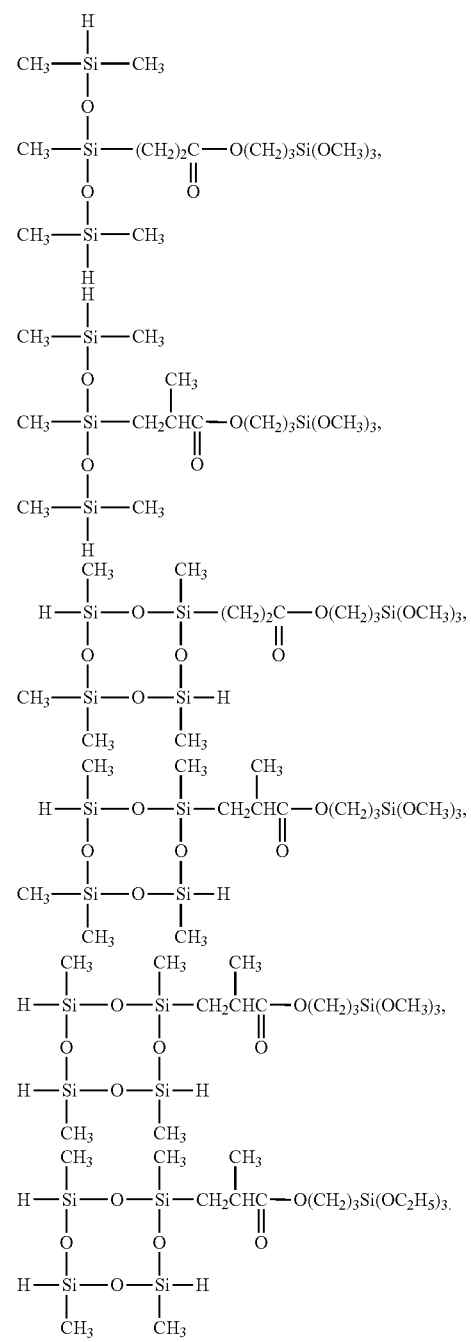

<<(E2)>>

(E2) is a component which is introduced into the crosslinked siloxane structure due to a cohydrolysis-condensation reaction of the alkoxy group bonded to a silicon atom and the alkoxy group bonded to a silicon atom of (E1), (E3) and/or (E4), so that the epoxy group as a portion that exhibits adhesion contributes to improvement of the adhesion of the composition at room temperature, particularly the adhesion to a plastic.

In view of giving excellent adhesion, $R^3$ is preferably a methyl group or an ethyl group, especially preferably a methyl group. n is preferably 2 or 3. In view of ease of synthesis and having no hydrolysability and exhibiting excellent adhesion, the epoxy group-containing group is preferably, for example, an aliphatic epoxy group-containing group having an ether oxygen atom, such as a 3-glycidoxypropyl group; or an alicyclic epoxy group-containing group, such as a 2-(3,4-epoxycyclohexyl)ethyl group. Two or more $Si(OR^3)_n$ groups may be present per molecule. The number of the $OR^3$ groups per molecule is preferably two or more. The $OR^3$ group and the epoxy group-containing group may be bonded to the same silicon atom, or may be bonded to different silicon atoms.

As examples of (E2), there can be mentioned 3-glycidoxypropyl group-containing alkoxysilanes, such as 3-glycidoxypropyltrimethoxysilane, 3-glycidoxypropyltriethoxysilane, and 3-glycidoxypropyl(methy)dimethoxysilane; 2-(3,4-epoxycyclohexyl)ethyl group-containing alkoxysilanes, such as 2-(3,4-epoxycyclohexyl)ethyltrimethoxysilane, 2-(3,4-epoxycyclohexyl)ethyltriethoxysilane, and 2-(3,4-epoxycyclohexyl)ethyl(methyl)dimethoxysilane; partial hydrolysis condensation products of the above silanes wherein n is 2 or more; and carbon/silicon both functional siloxane obtained by replacing part of the methyl groups of linear or cyclic methylsiloxane by a trimethoxysiloxy group or a 2-(trimethoxysilyl)ethyl group and the above-mentioned epoxy group-containing group.

<<(E3)>>

(E3) is a component which undergoes an addition reaction with component (B) upon curing of the composition, and which is introduced into the crosslinked siloxane structure due to the addition reaction of component (A) and component (B), so that the alkoxy group present in the side chain as a portion that exhibits adhesion contributes to improvement of the adhesion of the composition at room temperature, particularly the adhesion to a metal. Further, the alkoxy group of (E3) undergoes a cohydrolysis-condensation reaction with the alkoxy group of (E1), (E2) and/or (E4) to contribute to introduction of (E1), (E2) and/or (E4) into the crosslinked siloxane structure. (E3) is preferably a silane compound having an $Si(OR^3)_n$ group and one aliphatic unsaturated hydrocarbon group, and/or a partial hydrolysis condensation product thereof.

The alkoxy group of (E3) undergoes a cohydrolysis-condensation reaction with an alkoxy group of another (E3), and an alkoxy group of (E2) when (E2) is used in combination, to introduce another (E3) and/or (E2) into the siloxane structure.

In view of giving excellent adhesion, $R^3$ is preferably a methyl group or an ethyl group, especially preferably a methyl group. n is preferably 2 or 3. The aliphatic unsaturated hydrocarbon group is preferably a monovalent group. When the aliphatic unsaturated hydrocarbon group is an alkenyl group, such as vinyl, allyl, or 3-butenyl, the alkenyl group may be directly bonded to a silicon atom, and an unsaturated acyloxy group may be bonded to a silicon atom through three or more carbon atoms, such as 3-acryloxypropyl or 3-methacryloxypropyl. In view of ease of synthesis and handling, the unsaturated hydrocarbon group-containing group is preferably, for example, a vinyl group or a methacryloxypropyl group. Two or more $Si(OR^3)_n$ groups may be present per molecule. The number of the $OR^3$ groups per molecule is preferably two or more. The $OR^3$ group and the aliphatic unsaturated hydrocarbon group may be bonded to the same silicon atom, or may be bonded to different silicon atoms.

As examples of (E3), there can be mentioned alkenylalkoxysilanes, such as vinyltrimethoxysilane, vinyltriethoxysilane, vinyltris(2-methoxyethoxy)silane, methylvinyldimethoxysilane, allyltrimethoxysilane, allyltriethoxysilane, and methylallyldimethoxysilane, and/or a partial hydrolysis condensation product thereof; and (meth)acryloxypropyl (methyl)di- and (meth)acryloxypropyltri-alkoxysilanes, such as 3-acryloxypropyltrimethoxysilane, 3-acryloxypropyltriethoxysilane, 3-acryloxypropyl(methyl)dimethoxysilane, 3-methacryloxypropyltrimethoxysilane, 3-methacryloxypropyltriethoxysilane, and 3-methacryloxypropyl (methyl)dimethoxysilane, and/or a partial hydrolysis condensation product thereof.

<<(E4)>>

(E4) is a component which further improves the adhesion of the composition to a metal at room temperature. Examples of $R^4$'s include linear or branched alkyl groups, such as methyl, ethyl, propyl, and isopropyl, and preferred is a methyl group or an ethyl group in view of easy availability and ease of handling as well as remarkable improvement effect for the adhesion. Further, a tetraalkoxysilane compound as a simple substance can be used as (E4), but, in view of excellent hydrolysability and reduced toxicity, (E4) is preferably a partial hydrolysis condensation product of a tetraalkoxysilane compound.

<<Other Adhesion Imparting Agents>>

Examples of adhesion imparting agents other than (E1) to (E4) include metal alkoxides (excluding zirconium alkoxides), e.g., aluminum alkoxides, such as aluminum triethoxide, aluminum tripropoxide, and aluminum tributoxide; and titanium alkoxides, such as titanium tetraethoxide, titanium tetrapropoxide, titanium tetraisopropoxide, titanium tetrabutoxide, titanium tetraisobutoxide, and titanium tetraisopropenyloxide.

Further examples of the other adhesion imparting agents include a compound having in the molecule thereof a hydrolysable silyl group and a reactive organic functional group, such as the following compounds:

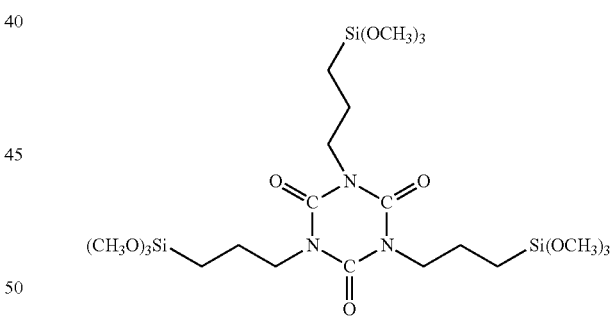

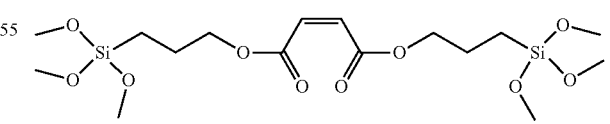

and/or a partial hydrolysis condensation product thereof (excluding (E1) to (E4)); a compound having in the molecule thereof a hydrogen atom bonded to a silicon atom and a reactive organic functional group, such as the following compound:

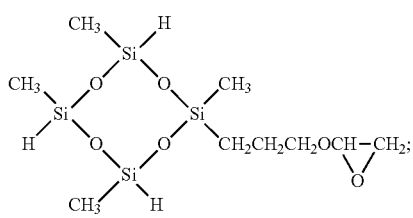

and
a compound having in the molecule thereof a hydrogen atom bonded to a silicon atom and a divalent aromatic group, such as the following compound:

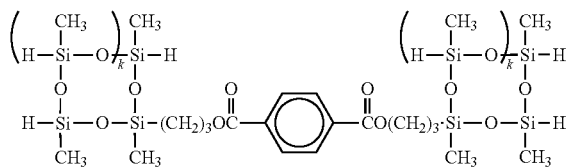

wherein k is an integer of 1 to 3.

When component (E) and the other adhesion imparting agent or agents are used in combination, the adhesive strength can be further improved.

<<Preferred Mode>>

Component (E) preferably comprises a combination of (E1), (E2), (E3) and/or (E4). Each of (E1) to (E4) may be a single member or a combination of two or more members.

<(F) Zirconium Compound>

For further improving the adhesion to various substrates including a polyphenylene sulfide resin at room temperature, it is preferred that the composition contains (F) a zirconium compound as an optional component. With respect to component (F), there is no particular limitation as long as it is a compound having zirconium. As examples of component (F), there can be mentioned zirconium acylates, such as zirconium octanoate, zirconium tetra(2-ethylhexanoate), and zirconium stearate; zirconium alkoxides (excluding zirconium chelates), such as n-propyl zirconate and n-butyl zirconate; and zirconium chelates, such as tributoxyzirconium acetylacetonate, dibutoxyzirconium bis(ethylacetoacetate), zirconium tetraacetylacetonate, zirconium monoacetylacetonate, and zirconium ethylacetoacetate. The zirconium chelate may have an alkoxy group as long as it has in the molecule thereof one or more chelate ligands (for example, $C_5H_7O_2$ or $C_6H_9O_3$). In view of more excellent adhesion to various substrates, component (F) is preferably a zirconium chelate compound.

<(G) Inorganic Filler Having a BET Specific Surface Area of 50 to 500 $m^2/g$>

For giving the composition appropriate fluidity and imparting a high mechanical strength to the cured product of the composition, it is preferred that the composition contains (G) an inorganic filler having a BET specific surface area (which is frequently referred to simply as "a specific surface area" in the present specification) of 50 to 500 $m^2/g$ as an optional component. Component (G) does not contain (D) an oxide or carbonate of a metal selected from metals belonging to Groups 2 and 12 of the Periodic Table.

As examples of component (G), there can be mentioned reinforcing fillers, such as fumed silica, calcined silica, silica aerogel, precipitated silica, fumed titanium oxide, and those which are obtained by hydrophobizing the surface of the above fillers with, for example, a polyorganosiloxane or hexamethyldisilazane; and non-reinforcing fillers, such as diatomaceous earth, ground silica, aluminum oxide, aluminosilicate, calcium silicate, talc, and iron(III) oxide, and component (G) is selected from these fillers according to the application operating properties and the physical properties required for the elastomeric material obtained after cured. Component (G) is preferably a reinforcing filler, more preferably silica, such as fumed silica, calcined silica, silica aerogel, or precipitated silica, especially preferably fumed silica.

Component (G) preferably has a BET specific surface area of 50 to 500 $m^2/g$, more preferably 80 to 400 $m^2/g$, further preferably 100 to 300 $m^2/g$, especially preferably 110 to 240 $m^2/g$.

<(H) Reaction Inhibitor>

It is preferred that the composition contains (H) a reaction inhibitor as an optional component. As examples of component (H), there can be mentioned organic compounds having a polar group in the molecule thereof, such as diallyl maleate; and organic compounds having an unsaturated bond, such as acetylene alcohols and derivatives thereof. Component (H) suppresses the curing reaction rate of the composition to contribute to an improvement of the operating properties for handling and the balance between the development of adhesion and the curing rate.

<(I) Additional Component>

The composition can contain (I) an additional component in such an amount that the effects aimed at by the present invention are not sacrificed. As examples of such components, there can be mentioned (I1) a polyorganohydrogensiloxane having in the molecule thereof two hydrogen atoms bonded to silicon atoms, and (I2) an additive of a certain type. (I1) is not (E). (I) an additional component may be individually a single member or a combination of two or more members.

<<(I1) Polyorganohydrogensiloxane having in the Molecule Thereof Two Hydrogen Atoms Bonded to Silicon Atoms>>

The composition can further comprise (H) a polyorganohydrogensiloxane having in the molecule thereof two hydrogen atoms bonded to silicon atoms. (I1) can be reacted with component (A) or the like to cause an addition reaction so as to serve as a chain extender. (I1) is as described in component (B) mentioned above except that (I1) has in the molecule thereof two hydrogen atoms bonded to silicon atoms. (I1) has in the molecule thereof two units represented by the general formula (II) mentioned above in connection with component (B).

The siloxane skeleton in (I1) may be linear, branched, or cyclic, and is preferably linear. Further, (I1) is more preferably a linear polyorganohydrogensiloxane having both ends each independently blocked by an $R^6_3SiO_{1/2}$ unit, and having an intermediate unit comprising only an $R^6_2SiO_{2/2}$ unit (wherein each $R^6$ is independently a hydrogen atom or a monovalent hydrocarbon group having no aliphatic unsaturated bond, with the proviso that two of $R^6$'s per molecule are a hydrogen atom). The hydrogen atom bonded to a silicon atom may be either present at an end or present in an intermediate unit, but is preferably present at an end. Thus, (I1) is especially preferably a polymethylhydrogensiloxane having both ends blocked by an $M^H$ unit (dimethylhydrogensiloxane unit) and having an intermediate unit comprising only a D unit (dimethylsiloxane unit).

<<(I2) Additive of a Certain Type>>

The composition can further contain (I2) an additive of a certain type depending on the purpose, e.g., an organic solvent, a pigment (excluding (D) and (G)), a conductive filler, such as carbon black, an agent for imparting thixotropy, a viscosity modifier for improving the application operating properties, an ultraviolet inhibitor, a mildewproofing agent, a heat resistance improver, or a flame retardant. (I2) an additive of a certain type may be individually a single member or a combination of two or more members. The composition may be dissolved or dispersed in an organic solvent, such as toluene or xylene, according to the use of the composition.

It is preferred that the composition contains no acid anhydride. When the composition contains no acid anhydride, a problem of corrosion of a metal substrate can be avoided.

[Formulation]

The amounts of the individual components contained in the composition are as follows.

The amount of component (A) contained, relative to 100 parts by weight of the total of components (B), (C), (D), and (E), is preferably 10 to 5,000 parts by weight, more preferably 50 to 4,000 parts by weight, especially preferably 100 to 3,000 parts by weight. When the amount of component (A) contained is in the above range, the adhesion at room temperature can be efficiently improved.

When component (A) is a mixture of (A1) a linear alkenyl group-containing polyorganosiloxane and (A2) a branched alkenyl group-containing polyorganosiloxane, the amount of (A2) contained, relative to 100 parts by weight of the total of (A1) and (A2), is preferably 1 to 80 parts by weight, especially preferably 1 to 60 parts by weight. When the amount of (A2) contained is 80 parts by weight or less, the crosslinking density is unlikely to be too high, so that the resultant cured product exhibits more excellent flexibility. Further, when the amount of (A2) contained is in the above range, the adhesion at room temperature is further improved.

The amount of component (B) contained is preferably such an amount that the ratio of the number H of the hydrogen atoms bonded to silicon atoms in component (B) to the number Vi of the alkenyl groups in component (A) (H/Vi) is 0.1 to less than 1.5, more preferably such an amount that the ratio H/Vi is 0.2 to 1.2, especially preferably such an amount that the ratio H/Vi is 0.3 to 1.0. When the H/Vi ratio in the composition is 0.1 or more, it is likely that the resultant cured product has excellent mechanical strength, and, when the H/Vi ratio in the composition is less than 1.5, it is likely that the adhesion of the composition to various members is improved.

The amount of component (C) contained, in terms of a platinum metal atom, is preferably 0.1 to 1,000 ppm by weight, especially preferably 0.5 to 200 ppm by weight, based on the weight of component (A). When the amount of component (C) contained is in the above range, it is likely that satisfactory quick-curing properties at room temperature can be obtained.

The content of component (D) in the whole composition is 0.1 to 20% by weight. The content of component (D) in the whole composition is preferably 0.3 to 10% by weight, especially preferably 0.5 to 6% by weight. When the content of component (D) in the whole composition is less than 0.1% by weight, a capturing effect for a compound containing sulfur derived from the polyphenylene sulfide resin cannot be obtained. When the content of component (D) is more than 20% by weight, the capturing effect is saturated.

When the composition contains (E1), (E2) and/or (E3), the total amount of (E1), (E2) and/or (E3), relative to 100 parts by weight of component (A), is preferably 0.1 to 20 parts by weight, especially preferably 0.5 to 10 parts by weight. When the total amount of (E1), (E2) and/or (E3) is in the above range, it is likely that satisfactory adhesion at room temperature is obtained and that the resultant cured product of the composition is improved in mechanical strength or flexibility. When the composition contains (E4), for imparting excellent adhesion to a metal at room temperature to the silicone rubber obtained after curing, the amount of component (E4) contained, relative to 100 parts by weight of component (A), is preferably 0.01 to 10 parts by weight, especially preferably 0.1 to 5 parts by weight. When component (E) is a mixture of two members selected from the group consisting of (E1) to (E4), for obtaining excellent adhesion, it is preferred that the weight of one of (E1) to (E4) is in the range of from 0.02 to 50 times the weight of another one. When component (E) is a mixture of three or four members selected from the group consisting of (E1) to (E4), it is preferred that each member is incorporated in an amount of 3% by weight or more of component (E).

The amount of component (F) contained, in terms of a zirconium atom in component (F), relative to 100 parts by weight of component (A), is preferably less than 0.10 part by weight, more preferably 0.0025 to less than 0.10 part by weight, further preferably 0.005 to 0.070 part by weight, especially preferably 0.010 to 0.050 part by weight. When the amount of component (F) contained, relative to 100 parts by weight of component (A), is in the above range, it is likely that more excellent adhesion to a polyphenylene sulfide resin at room temperature can be achieved.

The amount of component (G) contained, relative to 100 parts by weight of component (A), is preferably less than 50 parts by weight, more preferably 0.1 to 50 parts by weight, especially preferably 1 to 30 parts by weight. When the amount of component (G) contained is in the above range, the application operating properties are excellent, and the resultant cured product has excellent mechanical strength.

With respect to the amounts of components (H) and (I) contained, there is no particular limitation as long as the use of the composition aimed at by the present invention can be achieved.

With respect to the viscosity of the composition, there is no particular limitation, and the viscosity can be appropriately controlled according to the use of the composition so that the composition has fluidity or semi-fluidity or has no fluidity.

(Method for Producing the Composition)

The composition can be produced by uniformly kneading essential components (A) to (E) and optional components (F) to (I) using a mixing means, such as a universal kneading machine (a planetary mixer) or a kneader. The order of adding components (B), (C), and (E) is arbitrary, but it is preferred that these components are added in the order of (B), (C), and (E) and mixed with each other after the step of adding component (D) and optional component (G) to component (A) and mixing them.

(Preferred Mode of the Composition)

For achieving stable storage for a long term, the composition may be in such a mode that the components of the composition are appropriately divided and stored in two separate containers so that component (C) is contained in a container different from that of components (B) and (E1), and are mixed together immediately before used, and deaerated under a reduced pressure and then used. In this case, the composition is a composition having a first portion and a second portion, and comprising components (A) to (E) and optional components (F) to (I), wherein the first portion contains component (C), the second portion contains components (B) and (E1), and each of components (A), (D), and (E2) to (E4) and optional components (F) to (I) is independently contained in the first portion and/or the second portion. It is preferred that the method for producing the composition in this case comprises the step for obtaining a first portion, which comprises the steps of: (1a) adding component (D) and optional component (G) to component (A) and mixing them with each other, and (1b) adding component (C) and optional components (F), (H), and (I2) and optionally components (E2) to (E4) to the mixture obtained in step (1a) and mixing them with each other; and the step for obtaining a second portion, which comprises the steps of: (2a) adding component (D) and optional component (G) to component (A) and mixing them with each other, and (2b) adding components (B) and (E) and optional components (F), (H), and (I) to the mixture obtained in step (2a) and mixing them with each other.

(Method for Producing an Article Comprising an Adhesion Portion of a Polyphenylene Sulfide Resin and a Cured Product of the Composition)

The form of the polyphenylene sulfide resin and the cured product of the composition is not limited as long as the polyphenylene sulfide resin and the cured product of the composition have an adhesion portion.

For example, the first embodiment of the method for producing an article comprising an adhesion portion of a polyphenylene sulfide resin and a cured product of the composition comprises the steps of: preparing a part comprising a polyphenylene sulfide resin and the composition; applying the composition to the surface of the part; and curing the composition to bring adhesion between the part and a cured product of the composition. In the present embodiment, the cured product of the composition can serve as a protective film for the part. When the cured product of the composition serves as a protective film, the thickness of the cured product as a protective film is not particularly limited as long as the cured product maintains the properties of the protective film.

The part comprising a polyphenylene sulfide resin may be a composite material of a polyphenylene sulfide resin and one or more other materials. Examples of other materials include metals, such as aluminum, magnesium, nickel, iron, and copper, and alloys thereof, and organic resins, such as an ABS (acrylonitrile-butadiene-styrene) resin, a polycarbonate resin, and a PBT (polybutylene terephthalate) resin. The part is preferably an electric or electronic part, an optical part, or an automobile part.

The composition is applied to the site to be adhered on the surface of the part comprising a polyphenylene sulfide resin so as to have a predetermined thickness by a method of, for example, dropping, pouring, casting, extrusion from a container, coating, such as bar coating or roll coating, or screen printing. The composition may be thoroughly and uniformly applied to the surface of the part, or may be ununiformly or partially applied to the surface of the part, for example, in a line, stripe, or dot pattern.

The composition applied to the surface of the part is allowed to stand at room temperature (for example, 23° C.) or heated to a higher temperature so that the composition is cured, making it possible to bring adhesion between the part and a cured product of the composition. When heating to a higher temperature, the composition can be cured in a shorter time than the time required for the curing at room temperature, achieving an improvement of the operation efficiency.

The heating conditions can be appropriately controlled according to the heat-resistant temperature of the member to which the composition is applied, and the curing time can be appropriately determined. For example, the composition can be heated to higher than room temperature (23° C.) to 120° C. for a time period in the range of from one minute to two weeks, preferably 5 minutes to 72 hours. From the viewpoint of the operating properties, the heating temperature is preferably 40 to 120° C., especially preferably 50 to 110° C. From the viewpoint of simplicity of the curing step, the heating time is preferably 5 minutes to 72 hours, especially preferably 5 minutes to 24 hours. Further, when curing the composition at room temperature, the curing time is preferably one week or less, more preferably 72 hours or less, especially preferably 24 hours or less.

In one mode of the present embodiment, using a part in a sheet form as the part comprising a polyphenylene sulfide resin, an article in a sheet form having a cured product of the composition formed on one surface or both surfaces thereof can be obtained. The composition may be thoroughly and uniformly applied to the surface of the sheet, or may be ununiformly or partially applied to the surface of the sheet, for example, in a line, stripe, or dot pattern. With respect to the thickness of the sheet, there is no particular limitation. With respect to the thus obtained article in a sheet form, for example, by appropriately removing an unnecessary portion of the article, or by processing the article into, e.g., a hollow bead shape (line shape) or a ring shape, the resultant article can be used as, for example, a packing for automobile parts. When processed into, e.g., a bead shape or a ring shape, the form of the cross-section of the article can be, for example, a circle; an ellipse; a polygon, such as a triangle or a rectangle; or an indefinite form, and, with respect to the size of the article, there is no particular limitation.

In another mode of the present embodiment, using, as the part comprising a polyphenylene sulfide resin, a part having, e.g., a bead shape or a ring shape which is hollow or not hollow, and whose cross-section has a form, such as a circle; an ellipse; a polygon, e.g., a triangle or a rectangle; or an indefinite form, an article having a cured product of the composition formed on the outer surface of the part can be obtained. The article of this mode can also be used as, for example, a packing for automobile parts.

The second embodiment of the method for producing an article comprising an adhesion portion of a polyphenylene sulfide resin and a cured product of the composition comprises the steps of: preparing a container comprising a polyphenylene sulfide resin and the composition; filling the container with the composition; and curing the composition to bring adhesion between the container and a cured product of the composition.

The container comprising a polyphenylene sulfide resin may be comprised only of a polyphenylene sulfide resin, or may be comprised of a polyphenylene sulfide resin and one or more other materials. Examples of other materials include metals, such as aluminum, magnesium, nickel, iron, and copper, and alloys thereof, and organic resins, such as an ABS (acrylonitrile-butadiene-styrene) resin, a polycarbonate resin, and a PBT (polybutylene terephthalate) resin. As an example of the container using a polyphenylene sulfide resin and other materials, there can be mentioned a container having laminated a bottom plate made of aluminum and a body part made of a polyphenylene sulfide resin.

With respect to the shape of the container, there is no particular limitation as long as the container is capable of being filled with the composition, and examples of shapes include a cylinder; an elliptic cylinder; polygonal prisms, such as a triangular prism and a rectangular parallelepiped; a cylinder or prism having a base in an indefinite form; a shape like a bottle having on the top side a neck portion that is narrower than the bottom; a shape like a bowl having the top that is wider than the bottom; and a shape of a container having in the body part a depressed area or a protrusion. The form of the top and the form of the bottom of the container may be the same or different from each other. When the form of the top is different from that of the bottom, the area of the top may be the area of the bottom or larger, or may be smaller than the area of the bottom. The container is preferably an electronic part-mounted container.

With respect to the method for filling the container comprising a polyphenylene sulfide resin with the composition, there is no particular limitation, and filling is conducted by a method of, for example, dropping, pouring, casting, or extrusion from a container. With respect to the filling ratio of the composition to the whole volume of the container, there is no particular limitation, and the filling ratio is in an arbitrary range of more than 0 to 100%. The container is filled with the composition, and then allowed to stand at room temperature (for example, 23° C.) or heated to a higher temperature so that the composition is cured, making it possible to bring adhesion between the container and a cured product of the composition. When heating to a higher temperature, the composition can be cured in a shorter time than the time required for the curing at room temperature, achieving an improvement of the operation efficiency. The heating conditions for the composition are the same as those described above in connection with the first embodiment.

Further, a part, such as an electric or electronic part, an optical part, or an automobile part, is placed in the container at a predetermined position in advance, and then the container is filled with the composition, and the composition is cured, so that adhesion between the container and the part can be brought through a cured product of the composition. Alternatively, the container is filled with the composition, and then a part is placed at a predetermined position through the composition, and the composition is cured, so that adhesion between the container and the part can be brought through a cured product of the composition.

The part may comprise a polyphenylene sulfide resin or no polyphenylene sulfide resin, but preferably comprises a polyphenylene sulfide resin. Further, the part may be a composite material of a polyphenylene sulfide resin and one or more other materials.

The third embodiment of the method for producing an article comprising an adhesion portion of a polyphenylene sulfide resin and a cured product of the composition comprises the steps of: preparing a first part comprising a polyphenylene sulfide resin, a second part, and the composition; applying the composition to the surface of the first part and/or the second part; stacking the first part and the second part on one another through the composition; and curing the composition to bring adhesion between the first part and the second part through a cured product of the composition.

The first part comprises a polyphenylene sulfide resin. The first part may be a composite material of a polyphenylene sulfide resin and one or more other materials. Examples of other materials include metals, such as aluminum, magnesium, nickel, iron, and copper, and alloys thereof, and organic resins, such as an ABS (acrylonitrile-butadiene-styrene) resin, a polycarbonate resin, and a PBT (polybutylene terephthalate) resin.

With respect to the material for the second part, there is no particular limitation, and the material may be a polyphenylene sulfide resin, or may be other materials mentioned above in connection with the first part. The second part may be a composite material of a combination of two or more of the above-mentioned materials. The first part and the second part may be the same or different from each other.

The first part and the second part are preferably an electric or electronic part, an optical part, or an automobile part.

The composition is applied to the site to be adhered on the surface of the first part comprising a polyphenylene sulfide resin and/or the second part by a method of, for example, dropping, pouring, casting, extrusion from a container, coating, such as bar coating or roll coating, or screen printing. Then, the first part and the second part are stacked on one another through the composition. After stacking the parts, the adhesion site may be fixed using, for example, a jig for preventing the adhesion site from being moved or separated.

The step of applying the composition and the step of stacking the first part and the second part on one another through the composition may be simultaneously performed by, for example, pouring the composition into a portion between the first part and the second part which are held to have a predetermined gap therebetween.

The shape of the portions of the parts which are to be stacked is not limited as long as the parts can be stacked through the composition. Further, with respect to the thickness of the composition, there is no particular limitation as long as the sealing properties, mechanical strength and others of the site of the parts stacked through the composition can be maintained.

The first part and the second part are stacked on one another through the composition, and then allowed to stand at room temperature (for example, 23° C.) or heated to a higher temperature so that the composition is cured, making it possible to bring adhesion between these parts through a cured product of the composition. When heating to a higher temperature, the composition can be cured in a shorter time than the time required for the curing at room temperature, achieving an improvement of the operation efficiency. The heating conditions for the composition are the same as those described above in connection with the first embodiment.

The step of applying the composition, the step of stacking the first part and the second part on one another through the composition, and the curing and adhesion step may be simultaneously performed by integrally molding the first part, the cured product of the composition, and the second part, using transfer molding or injection molding.

(Article Comprising an Adhesion Portion of a Polyphenylene Sulfide Resin and a Cured Product of the Composition)

The article comprising an adhesion portion of a polyphenylene sulfide resin and a cured product of the composition has excellent adhesion of the adhesion portion and has a small lowering of the adhesion even when used in a high temperature environment. When adhesion between a polyphenylene sulfide resin and the other material is brought through a cured product of the composition, there is no particular limitation with respect to the other material, and, for example, there can be used a metal, such as aluminum, magnesium, nickel, iron, or copper, or an alloy thereof, or an organic resin, such as an ABS (acrylonitrile-butadiene-styrene) resin, a polycarbonate resin, a PBT (polybutylene terephthalate) resin, or a PPS (polyphenylene sulfide) resin.

(Use)

The composition can be used in, for example, mounting or sealing for electric or electronic parts and automobile parts, and adhesion of a semiconductor or a general-purpose plastic. Specifically, the composition can be used in a sealing agent or a potting agent for various types of parts, such as an optical element, a semiconductor module, and a packing. The composition is preferably used in the application for adhesion of a polyphenylene sulfide resin in the above parts and others. Further, the article comprising an adhesion portion of a polyphenylene sulfide resin and a cured product of the composition can be advantageously used in the application in which the article is exposed to a high temperature environment at 100° C. or higher, specifically at 120° C. or higher, particularly at 150° C. or higher.

EXAMPLES

Hereinbelow, the present invention will be described in more detail with reference to the following Examples and Comparative Example. In the following Examples and Comparative Example, the "part(s)" indicates part(s) by weight, and the viscosity means a viscosity as measured at 23° C. The following Examples and Comparative Example should not be construed as limiting the scope of the present invention.
(Components Used)
The components used in the Examples and Comparative Example are as follows.
(A) Alkenyl Group-Containing Polyorganosiloxane
   A-1: Linear polymethylvinylsiloxane represented by $M^{vi}D_nM^{vi}$ (wherein n is a value such that the polymethylvinylsiloxane has a viscosity of 10 Pa·s at 23° C.)
   A-2: Branched polymethylvinylsiloxane comprised only of an M unit, an $M^{vi}$ unit, and a Q unit, wherein the molar ratio of the units is represented by $M_5M^{vi}Q_8$ (weight average molecular weight: 4,000; four vinyl groups on average per molecule)
(B) Polyorganohydrogensiloxane
   B: Linear polymethylhydrogensiloxane (20 hydrogen atoms on average per molecule) being represented by $MD^H{}_{20}D_{20}M$, and having a viscosity of 20 mPa·s at 23° C.
(C) Platinum Catalyst
   C: Platinum-vinylsiloxane complex (Pt-$M^{vi}M^{vi}$ complex) which is obtained by heating chloroplatinic acid together with a siloxane dimer represented by $M^{vi}M^{vi}$, and which has a platinum content of 2.0% by weight
(D) Oxide or Carbonate of a Metal Selected from Metals Belonging to Groups 2 and 12 of the Periodic Table
   D-1: Calcium carbonate (NS #400, manufactured by Nitto Funka Kogyo K.K.; average particle diameter: 1.7 μm)
   D-2: Magnesium oxide (PYROKISUMA 5301, manufactured by Kyowa Chemical Industry Co., Ltd.; average particle diameter: 2.0 μm)
   D-3: Zinc oxide (Zinc white No. 1, manufactured by Mitsui Mining & Smelting Co., Ltd.; average particle diameter: 0.75 μm)
(E) Adhesion Imparting Agent
   E-1: Cyclic siloxane represented by the formula:

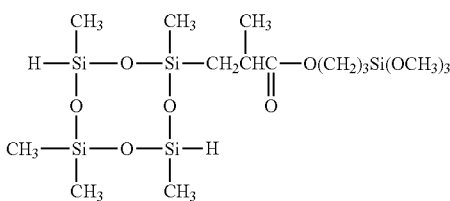

E-2: 3-Glycidoxypropyltrimethoxysilane
   E-3: Vinyltrimethoxysilane
   E-4: Partial hydrolysis condensation product (tetramer) of tetramethoxysilane (MKC (registered trademark) Silicate MS51, manufactured by Mitsubishi Chemical Corporation)
(F) Zirconium Compound
   F: $(n-C_4H_9O)_3Zr(C_5H_7O_2)$ Tributoxyzirconium acetylacetonate (ZC-540, manufactured by Matsumoto Fine Chemical Co., Ltd.); effective component: 45% by weight; metal content: 10.2% by weight
(G) Inorganic Filler Having a BET Specific Surface Area of 50 to 500 $m^2/g$
   G: Fumed silica having a specific surface area of 160 $m^2/g$ (Aerosil R-8200, manufactured by Nippon Aerosil Co., Ltd.)
(H) Reaction Inhibitor
   H: Diallyl maleate Example 1

(1) Preparation of a First Portion
47.0 Parts by weight of a solution which had been preliminarily prepared by dissolving A-2 in A-1 in a 1:1 weight ratio, 1.0 part by weight of D-1, and 18.0 parts by weight of G were transferred to a universal kneading machine (a planetary mixer), and stirred at room temperature (23° C.) for 60 minutes, and stirred under a reduced pressure at 150° C. for 60 minutes. The resultant mixture was cooled to 50° C. or lower, and 40.0 parts by weight of A-1 was added and the mixture was stirred for 30 minutes. C was added to the resultant mixture so that the amount of C became 100 ppm by weight, in terms of a platinum metal atom, based on the total weight of A-1 and A-2, and the mixture was stirred at room temperature for 10 minutes. 0.25 Part by weight of F was added and the mixture was stirred at room temperature for 10 minutes to prepare a "first portion". The formulation of the first portion is shown in Table 1.
(2) Preparation of a Second Portion
47.0 Parts by weight of a solution which had been preliminarily prepared by dissolving A-2 in A-1 in a 1:1 weight ratio, 1.0 part by weight of D-1, and 18.0 parts by weight of G were transferred to a universal kneading machine (a planetary mixer), and stirred at room temperature (23° C.) for 60 minutes, and stirred under a reduced pressure at 150° C. for 60 minutes. The resultant mixture was cooled to 50° C. or lower, and 28.9 parts by weight of A-1 was added and the mixture was stirred for 30 minutes. 3.135 Parts by weight of B was added and the mixture was stirred at room temperature for 10 minutes. 0.03 Part by weight of H, 6.0 parts by weight of E-1, 0.88 part by weight of E-2, 1.0 part by weight of E-3, and 0.32 part by weight of E-4 were added and the mixture was stirred at room temperature for 10 minutes to prepare a "second portion". The formulation of the second portion is shown in Table 2.
(3) Preparation of a Polyorganosiloxane Composition (Mixture of the First Portion and the Second Portion)
The "first portion" and the "second portion", which were prepared in advance, were mixed together, and subjected to deaeration by quickly kneading under a reduced pressure for 10 minutes, preparing a polyorganosiloxane composition (mixture of the first portion and the second portion). The H/Vi ratio in the composition was 0.60.

Examples 2 to 6

A "first portion" and a "second portion" were prepared in substantially the same manner as in Example 1 except that the type and amount of component D were changed, and polyorganosiloxane compositions in Examples 2 to 6 were prepared. The formulation of the first portion and the formulation of the second portion in Examples 2 to 6 are respectively shown in Table 1 and Table 2.

Comparative Example 1

A "first portion" and a "second portion" were prepared in substantially the same manner as in Example 1 except that component D was not incorporated, and a polyorganosiloxane composition in Comparative Example 1 was prepared. The formulation of the first portion and the formulation of the second portion in Comparative Example 1 are respectively shown in Table 1 and Table 2.
(Evaluation Method)
<Preparation of a Test Specimen>

A test specimen for an adhesion test under shear was prepared in accordance with JIS K6249:2003 as described below. Specifically, the procedure was as follows.

With respect to each of the compositions in Examples 1 to 6 and Comparative Example 1, a caulking cartridge was filled with the composition. Two resin plates (80 mm×25 mm×2 mm) of a polyphenylene sulfide resin (SUSTEEL (registered trademark) GS-40%, manufactured by Tosoh Corporation) were prepared. The composition was applied to one surface of one of the resin plates by extruding the composition from the caulking cartridge so that the application length from one short side became 10 mm, the applied portion had a size of 25 mm×10 mm, and the thickness became 1.0 mm. Another resin plate was stacked from one short side on the potion to which the composition was applied so that the adhesion portion had a size of 25 mm×10 mm, and the stacked portions of the resin plates were fixed using a jig. The thus fixed resin plates were heated at 50° C. for 30 minutes to cure the composition so as to bring adhesion between the resin plates, obtaining a test specimen.
<150° C. Storage Test>

Test specimens for an adhesion test under shear were individually subjected to accelerated test in a hot-air-circulating dryer at 150° C. for 250, 500, and 1,000 hours, and subjected to the below-described adhesion test under shear and evaluation of cohesive failure rate.
<Adhesion Test Under Shear>

With respect to each of the test specimen obtained after one day from the preparation as a specimen for initial evaluation, and the test specimens obtained after subjected to accelerated test at 150° C. for 250, 500, and 1,000 hours, an adhesive force under shear was evaluated in accordance with JIS K6249:2003. The rate of pulling was 10 mm/min.
<Evaluation of Cohesive Failure Rate>

With respect to the test specimen which had been subjected to adhesion test under shear, the adhered surface of the test specimen was observed, and a proportion of the area of the cured product adhering on the polyphenylene sulfide resin to the whole adhered area was determined and evaluated as a cohesive failure rate. The determined cohesive failure rate was a value that increases or decreases by 10%. The larger the cohesive failure rate, the stronger the adhesion of the interface between the polyphenylene sulfide resin and the cured product of the composition.

With respect to the test specimens prepared using the compositions in Examples 1 to 6 and Comparative Example 1, the results of the measurement of the initial adhesive force under shear and cohesive failure rate and those after stored at 150° C. are shown in Table 3.

TABLE 1

| | Raw materials | Example 1 | Example 2 | Example 3 | Example 4 | Example 5 | Example 6 | Comparative Example 1 |
|---|---|---|---|---|---|---|---|---|
| A-1 | $M^{vi}D_nM^{vi}$ (Viscosity: 10 Pa · s) | 63.5 | 63.5 | 63.5 | 63.5 | 63.5 | 63.5 | 63.5 |
| A-2 | $M_5M^{Vi}Q_8$ | 23.5 | 23.5 | 23.5 | 23.5 | 23.5 | 23.5 | 23.5 |
| C | Pt—$M^{vi}M^{vi}$ Complex (Pt Content: 2.0 wt %) | 100 ppm | 100 ppm | 100 ppm | 100 ppm | 100 ppm | 100 ppm | 100 ppm |
| D-1 | $CaCO_3$ | 1.0 | 5.0 | | | | | |
| D-2 | MgO | | | 1.0 | 5.0 | | | |
| D-3 | ZnO | | | | | 1.0 | 5.0 | |
| F | $(n-C_4H_9O)_3Zr(C_5H_7O_2)$ | 0.25 | 0.25 | 0.25 | 0.25 | 0.25 | 0.25 | 0.25 |
| G | Aerosil R-8200 | 18.0 | 18.0 | 18.0 | 18.0 | 18.0 | 18.0 | 18.0 |
| | Total | 106.25 | 110.25 | 106.25 | 110.25 | 106.25 | 110.25 | 105.25 |

The formulation for C is a value, in terms of a platinum metal atom, based on the total weight of A-1 and A-2.

TABLE 2

| | Raw materials | Example 1 | Example 2 | Example 3 | Example 4 | Example 5 | Example 6 | Comparative Example 1 |
|---|---|---|---|---|---|---|---|---|
| A-1 | $M^{vi}D_nM^{vi}$ (Viscosity: 10 Pa · s) | 52.4 | 52.4 | 52.4 | 52.4 | 52.4 | 52.4 | 52.4 |
| A-2 | $M_5M^{Vi}Q_8$ | 23.5 | 23.5 | 23.5 | 23.5 | 23.5 | 23.5 | 23.5 |
| B | $MD^H{}_{20}D_{20}M$ | 3.135 | 3.135 | 3.135 | 3.135 | 3.135 | 3.135 | 3.135 |
| D-1 | $CaCO_3$ | 1.0 | 5.0 | | | | | |
| D-2 | MgO | | | 1.0 | 5.0 | | | |
| D-3 | ZnO | | | | | 1.0 | 5.0 | |
| E-1 | Cyclic siloxane | 6.0 | 6.0 | 6.0 | 6.0 | 6.0 | 6.0 | 6.0 |
| E-2 | 3-Glycidoxypropyltrimethoxysilane | 0.88 | 0.88 | 0.88 | 0.88 | 0.88 | 0.88 | 0.88 |
| E-3 | Vinyltrimethoxysilane | 1.0 | 1.0 | 1.0 | 1.0 | 1.0 | 1.0 | 1.0 |
| E-4 | Partial hydrolysis condensation product (tetramer) of tetramethoxysilane | 0.32 | 0.32 | 0.32 | 0.32 | 0.32 | 0.32 | 0.32 |

TABLE 2-continued

|   | Raw materials | Example 1 | Example 2 | Example 3 | Example 4 | Example 5 | Example 6 | Comparative Example 1 |
|---|---|---|---|---|---|---|---|---|
| G | Aerosil R-8200 | 18.0 | 18.0 | 18.0 | 18.0 | 18.0 | 18.0 | 18.0 |
| H | Diallyl maleate | 0.03 | 0.03 | 0.03 | 0.03 | 0.03 | 0.03 | 0.03 |
|   | Total | 106.265 | 110.265 | 106.265 | 110.265 | 106.265 | 110.265 | 105.265 |

TABLE 3

|   |   |   | Example 1 | Example 2 | Example 3 | Example 4 | Example 5 | Example 6 | Comparative Example 1 |
|---|---|---|---|---|---|---|---|---|---|
| Initial |   | Adhesive force under shear MPa | 1.84 | 1.76 | 1.72 | 1.68 | 1.60 | 1.80 | 1.82 |
|   |   | Cohesive failure rate % | 100 | 100 | 100 | 100 | 100 | 100 | 100 |
| Stored at 150° C. | 250 hr | Adhesive force under shear MPa | 2.27 | 2.65 | 1.83 | 2.54 | 2.81 | 3.38 | 1.36 |
|   |   | Cohesive failure rate % | 90 | 100 | 30 | 100 | 100 | 100 | 20 |
|   | 500 hr | Adhesive force under shear MPa | 2.34 | 3.05 | 1.90 | 2.88 | 3.03 | 3.85 | 1.96 |
|   |   | Cohesive failure rate % | 40 | 100 | 20 | 90 | 100 | 100 | 10 |
|   | 1000 hr | Adhesive force under shear MPa | 1.41 | 2.55 | 1.10 | 1.76 | 2.19 | 2.68 | 0.91 |
|   |   | Cohesive failure rate % | 20 | 80 | 10 | 40 | 100 | 100 | 5 |

As apparent from Table 3, the polyorganosiloxane compositions in Examples 1 to 6 have not only excellent initial adhesion to the polyphenylene sulfide resin but also a small lowering of the adhesion after stored at 150° C.

A comparison made between Examples 1 and 2, Examples 3 and 4, and Examples 5 and 6 shows that, in the order of zinc oxide, calcium carbonate, and magnesium oxide, component D is excellent and causes a small lowering of the cohesive failure rate after stored at 150° C. Further, a comparison made between Examples 1, 3, and 5 and Examples 2, 4, and 6 shows that Examples 2, 4, and 6, in which the amount of the incorporated component D is 5.0 parts by weight, are excellent such that a lowering of the cohesive failure rate after stored at 150° C. is small.

In Example 5 in which zinc oxide is used as component D, despite the amount of the incorporated component D which is as small as 1.0 part by weight, the adhesive force under shear after subjected to accelerated test at 150° C. for 1,000 hours was high, and 100% of the cohesive failure rate was maintained, and thus the adhesion to the polyphenylene sulfide resin after stored at 150° C. was excellent.

The composition in Comparative Example 1 does not contain component D, and hence had excellent initial adhesion to the polyphenylene sulfide resin, but was markedly lowered in the adhesive force under shear and cohesive failure rate after subjected to accelerated test at 150° C. even for 250 hours.

INDUSTRIAL APPLICABILITY

The polyorganosiloxane composition of the present invention for use in adhesion of a polyphenylene sulfide resin can be used as an adhesive for parts exposed to a high temperature environment, such as electric or electronic parts and automobile parts.

The invention claimed is:

1. A method of adhering a polyphenylene sulfide resin and a cured product of a polyorganosiloxane composition, the method comprising:
   applying the polyorganosiloxane composition to the polyphenylene sulfide resin; and
   curing the polyorganosiloxane composition;
   wherein the polyorganosiloxane composition comprises:
   (A) a polyorganosiloxane containing two or more alkenyl groups per molecule;
   (B) a polyorganohydrogensiloxane having three or more hydrogen atoms bonded to silicon atoms per molecule;
   (C) a platinum catalyst;
   (D) an oxide or carbonate of a metal selected from metals belonging to Groups 2 and 12 of the Periodic Table; and
   (E) an adhesion imparting agent,
   wherein the content of the component (D) in the whole composition is 0.1 to 20% by weight,
   wherein the component (D) is selected from the group consisting of magnesium oxide, calcium carbonate, and zinc oxide, and
   wherein the component (A) is a combination of (A1) a linear polyorganosiloxane having both ends blocked by an $R_3SiO_{1/2}$ unit and having an $R_{22}SiO_{2/2}$ unit as an intermediate unit, and having a viscosity of 0.1 to 500 Pas at 23° C., and (A2) a branched polyorganosiloxane comprising an $SiO_{4/2}$ unit and an $R_3SiO_{1/2}$ unit and optionally further comprising at least one unit selected from the group consisting of an $R_2SiO_{2/2}$ unit and/or an $RSiO_{3/2}$ unit, wherein, in the above formulae, R is $R^1$ or $R^2$, wherein $R^1$ is an alkenyl group, $R^2$ is a monovalent hydrocarbon group having no aliphatic unsaturated bond, and two or more $R^1$'s are contained per molecule.

2. The method according to claim 1, wherein the component (D) is zinc oxide.

3. The method according to claim 1, wherein the component (E) comprises at least one member selected from the group consisting of the following (E1) to (E4):
   (E1) an organosilicon compound having a hydrogen atom bonded to a silicon atom, and having a side chain of the following formula (1) bonded to a silicon atom:

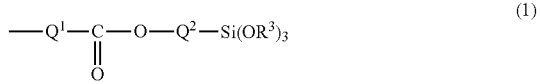

(E2) an organosilicon compound having an Si(OR$^3$)$_n$ group and an epoxy group-containing group, and/or a partial hydrolysis condensation product thereof, (E3) a silane compound having an Si(OR$_3$)$_n$ group and an aliphatic unsaturated hydrocarbon group, and/or a partial hydrolysis condensation product thereof, and (E4) a tetraalkoxysilane compound represented by Si(OR$^4$)$_4$, and/or a partial hydrolysis condensation product thereof, wherein, in the above formulae, Q$^1$ represents a linear or branched alkylene group which forms a carbon chain having two or more carbon atoms between the silicon atom and the ester linkage; Q$^2$ represents a linear or branched alkylene group which forms a carbon chain having three or more carbon atoms between the oxygen atom and the silicon atom of the side chain; R$^3$ represents an alkyl group having 1 to 4 carbon atoms or a 2-methoxyethyl group; R$^4$ represents an alkyl group having 1 to 3 carbon atoms; and n is an integer of 1 to 3.

4. The method according to claim 1, wherein the component (C) is a platinum-vinylsiloxane complex.

5. The method according to claim 1, further comprising (F) a zirconium compound.

6. The method according to claim 1, further comprising (G) an inorganic filler having a BET specific surface area of 50 to 500 m$^2$/g.

7. The method according to claim 1, further comprising (H) a reaction inhibitor.

8. An article obtained by the method according to claim 1 and comprising an adhesion portion of the polyphenylene sulfide resin and the cured product of the polyorganosiloxane composition.

* * * * *